Sept. 9, 1958  J. J. BIKERMAN  2,851,511
ELECTRODE ASSEMBLY AND METHOD OF MAKING SAME
Filed May 20, 1953

JACOB J. BIKERMAN
INVENTOR.

BY

AGENT

United States Patent Office 2,851,511
Patented Sept. 9, 1958

2,851,511

ELECTRODE ASSEMBLY AND METHOD OF MAKING SAME

Jacob J. Bikerman, Woodside, N. Y., assignor to Yardney International Corp., New York, N. Y., a corporation of New York Application May 20, 1953, Serial No. 356,200

10 Claims. (Cl. 136—143)

My present invention relates to separators for electric batteries (primary or secondary), and in particular those wherein electrodes of opposite polarities are applied under pressure against one or more layers of a semi-conductive spacer material. Batteries of this type, using an alkaline electrolyte and negative and positive electrodes containing zinc and silver, respectively, have been disclosed, for example, in U. S. Patents Nos. 2,594,709 through 2,594,714 owned by the assignee of this application.

Previously, as particularly disclosed in some of the aforementioned patents, it has been found advantageous to wrap the electrodes of at least one polarity in envelopes of semi-permeable material which were folded into U-shape, the arms of the U projecting above the electrolyte level and being open at the top to enable the escape of gases. This arrangement, while insuring satisfactory separation between the negative and the positive electrodes, has a drawback in that it impedes adequate irrigation of the enveloped electrodes by the electrolyte, this drawback usually becoming manifest only after a relatively large number of charge-discharge cycles.

One of the objects of my invention is to provide improved separator means of one or more layers of semi-permeable material arranged in such manner as to afford the necessary irrigation of all electrodes without impairing the separation between those of negative and those of positive polarity.

Another object of my invention is to provide a method of forming an electrode assembly, comprising negative and positive electrodes with separator means therebetween, in such manner as to speed up production by avoiding the necessity for individually wrapping a number of electrodes.

A further object of my invention is to provide an alkali-resistant adhesive adapted to be used in forming a seal on a separator membrane.

An electrode assembly according to my invention comprises an undulated or zig-zag-shaped separator member incorporating one or more layers of semi-permeable material, the undulations forming pockets in which electrodes of positive and of negative polarity are alternately disposed. This assembly is fitted inside a casing in such manner as to provide substantially fluid-tight contact between the separator member and the walls of the casing, whereby the latter is divided, in effect, into two distinct electrolyte compartments of preferably like volume communicating only through the semi-permeable membrane or membranes. The spaces formed by the odd-numbered and by the even-numbered undulations of the separator member, respectively containing electrodes of one and of the other polarity, thus form part of one and of the other of said compartments, respectively, thereby giving the electrolyte of each compartment free access to at least one of the edges of the corresponding electrodes.

The substantially fluid-tight seal between the separator member and the casing walls may be brought about by pressure and/or by bond; this bond, in turn, may be accomplished by a suitable adhesive or by thermal fusion. It should be noted at this point that the term "casing walls," in its broadest sense, includes any partition member, rigid or other, inserted in the casing proper and helping to define with said separator member a plurality of compartments electrolytically insulated from one another except by way of the interstices of a semi-permeable membrane.

Another aspect of the invention resides in a manufacturing method comprising the steps of forming undulations in an elongated separator member as hereinabove defined, placing this member in a battery casing so as to divide the interior thereof into a pair of compartments separated by said member, and inserting electrodes of different polarities in respective ones of said compartments within the undulations of said member.

The invention will be described in detail with reference to the accompanying drawing in which.

Figure 1:
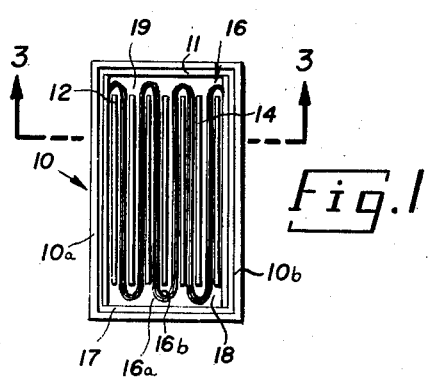
Fig. 1 is a top plan view of a battery casing containing an electrode assembly according to this invention.
Figure 2:
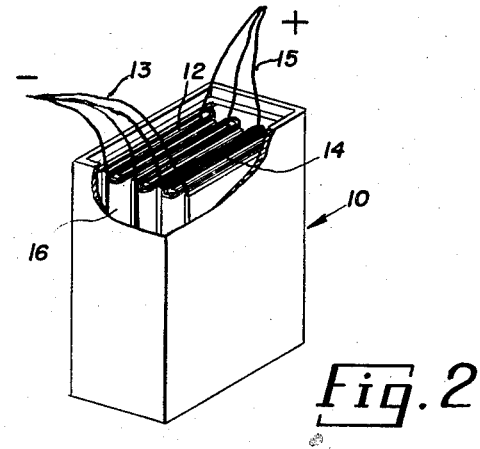
Fig. 2 is a perspective view of the casing (parts broken away) of Fig. 1.
Figure 3:
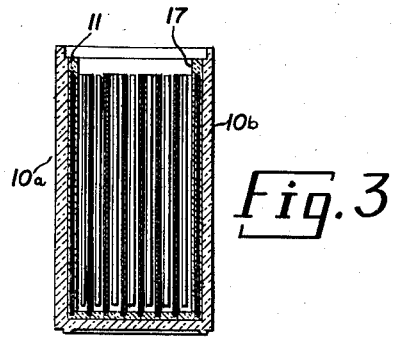
Fig. 3 is a section taken along line 3—3 of Fig. 1.

Referring first to Figs. 1, 2 and 3, there is shown a casing 10 of preferably moldable plastic material, e. g. polystyrene, provided along its open top with an internal recess 11 to accommodate a cover (not shown). Negative electrodes 12, with leads 13 projecting therefrom, and positive electrodes 14, provided with terminal conductors 15, alternate within the casing 10 and occupy respective folds of a separator member 16 extending between opposite side walls 10a, 10b of the casing. In a preferred embodiment the active materials of said positive and said negative electrode plate consist primarily of silver and zinc respectively.

An electrolyte-resistant adhesive material 17 forms a layer along the bottom and along the sidewalls 10a, 10b of the casing 10. The separator member 16, as best seen in Figs. 1 and 3, has its lower ends and its horizontal extremities anchored within this layer, thereby completing the separation between the negative compartment 18 and the positive compartment 19 formed in the interior of the casing 10. The adhesive may, in the case of an alkaline electrolyte, comprise a mixture of paraffin and rosin, prepared by melting paraffin at a temperature of, say, from 100 to 120° C. and substantially saturating the melt with rosin, as by stirring rosin powder into the melt until the powder no longer dissolves therein. The resulting mixture is substantially non-conductive electrically and highly resistant to attack by the electrolyte, with the rosin acting as a plasticizer and surfactant for the paraffin.

The separator member 16 shown in Figs. 1–3 consists of two semi-permeable layers 16a, 16b facing the negative compartment 18 and the positive compartment 19, respectively. These two layers may, accordingly, consist of dissimilar materials having higher penetration resistance to negative (e. g. zinc) and to positive (e. g. silver) ions, respectively. Layer 16a may consist, for example, of cellulose (regenerated cellulose); layers 16b may consist of a resinous film incorporating an ion-exchange agent, e. g. as disclosed in co-pending application Ser. No. 251,780, filed October 17, 1951, by Meyer Mendelsohn.

Figure 4:
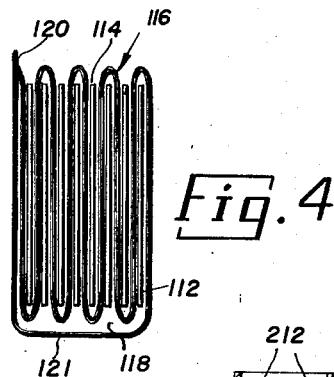
Fig. 4 is a top plan view of a modified electrode assembly (without the casing) according to the invention.

Fig. 4 shows an assembly of negative electrodes 112 and positive electrodes 114 placed in undulations of a separator member 116, the latter consisting at least in part of heat-sealable material (e. g. polyvinyl alcohol, as disclosed in U. S. Patent No. 2,635,127). A thermal seal is formed at 120, thus obviating the need for anchoring the ends of the separator in a layer such as 17 in the manner shown in the preceding embodiment. It will be noted that one electrolyte compartment, shown at 118, is here formed between the undulated portion of the separator member 116 and a portion 121 thereof, the latter portion thus replacing one of the walls of casing 10 in defining such compartment.

Figure 5:
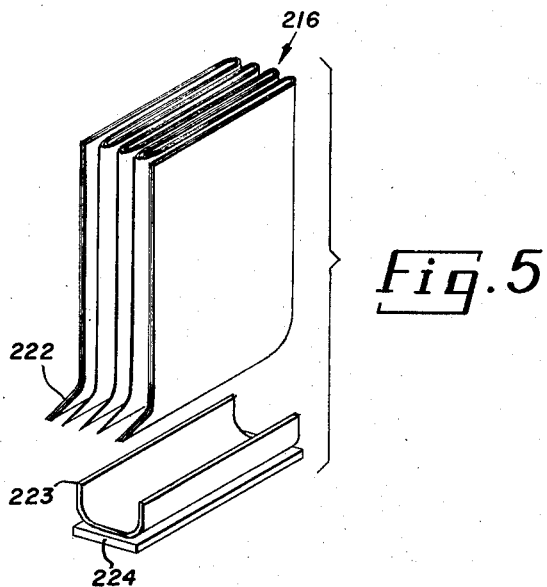
Fig. 5 is a perspective view of the elements of a separator member adapted to form part of yet a further electrode assembly embodying the invention.
Figure 6:
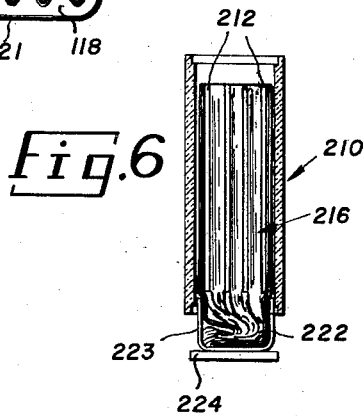
Fig. 6 is an elevational view of the last-mentioned assembly shown during introduction thereof into a casing.

Figs. 5 and 6 illustrate another mode of forming an electrode assembly with the aid of a heat-sealable separator material. The undulated member 216 has depending flaps 222 projecting beyond the lower edge of the electrode plates such as 212; another sheet member 223 of similar material is thermally sealed onto detached bottom 224 of a plastic casing 210. When the assembly is to be completed, the flaps 222 are thermally fused together and the member 224 is heat-sealed around them, as shown in Fig. 6, whereby the elements 216, 223 and 224 are welded into a unit; this unit with the negative electrode plates 212 and similar positive plates (not shown) placed in the folds of member 216, is then introduced from below into the casing 210, whereupon the bottom 224 may be glued or cemented into the recess of the casing provided therefor.

It is to be understood that the invention is not limited to the specific embodiments hereinabove disclosed and that, in particular, the sealing compound described herein may be used to form a semi-permeable envelope or bag, e. g. of cellophane, around a single electrode or a small number of electrodes in an alkaline cell. This and other modifications and adaptations will be obvious to persons skilled in the art, in the light of the foregoing disclosure, and are intended to be embraced in the scope of the appended claims except as specifically limited otherwise.

I claim:

1. In an electric battery, in combination, a casing, a vertically folded semi-permeable separator member in said casing forming at least two pockets open toward opposite sides, means including said separator member dividing the interior of said casing into two compartments communicating with alternate ones of said pockets, said compartments being separated electrolytically from each other except through said separator member, a positive electrode plate in one of said compartments, a negative electrode plate in the other of said compartments, each compartment being partly filled with free electrolyte having direct access to said positive and said negative electrode plate, respectively, said electrode plates facing each other across said separator member, and means applying said plates under pressure against said separator member.

2. The combination according to claim 1, including an electrolyte-resistant compound forming a bond between said separator member and said casing, thereby completing the mechanical separation of said compartments from each other.

3. The combination according to claim 1 wherein said separator member incorporates a layer of heat-sealable material having portions thermally fused together to complete the mechanical separation of said compartments from each other.

4. The combination according to claim 1 wherein said separator member and said casing are of thermally fusible material and are heat-sealed together to complete the mechanical separation of said compartments from each other.

5. The combination according to claim 1 wherein said separator member comprises at least two substantially coextensive layers including a first layer facing said positive electrode plate and a second layer facing said negative electrode plate, said first layer being of a first material relatively more penetration-resistant with respect to particles of active material of said positive electrode plate, said second layer being of a second material relatively more penetration-resistant with respect to particles of active material of said negative electrode plate.

6. The combination according to claim 5 wherein said active material of said positive and of said negative electrode plate consists primarily of silver and of zinc, respectively.

7. In an electric battery, in combination, a casing, a vertically folded separator member incorporating at least one layer of semi-permeable material, the folds of said separator member forming the sides of a plurality of pockets, and a plurality of electrode plates of alternately positive and negative polarity disposed in respective ones of said pockets, said separator member and said electrode plates together constituting an assembly fitting tightly inside said casing, the interior of said casing being divided into two compartments electrolytically connected only through said separator member and communicating with alternate ones of said pockets, each compartment being partly filled with free electrolyte having direct access to the electrode plates of a respective polarity.

8. The combination according to claim 7, including an electrolyte-resistant sealing compound in said casing forming a bond between said casing and said member, and completing the mechanical separation between said compartments.

9. The combination according to claim 8 wherein said sealing compound is a mixture of paraffin and rosin.

10. The combination according to claim 7 wherein said member comprises at least one semi-permeable material selected from the group which consists of regenerated cellulose and polyvinyl alcohol.

References Cited in the file of this patent

UNITED STATES PATENTS

| | | |
|---|---|---|
| 2,010,498 | Smith | Aug. 6, 1935 |
| 2,387,529 | Pearsall | Oct. 23, 1945 |
| 2,392,389 | Joyce | Jan. 8, 1946 |
| 2,564,495 | Mullen | Aug. 14, 1951 |
| 2,594,713 | Andre | Apr. 29, 1952 |

FOREIGN PATENTS

| | | |
|---|---|---|
| 380,047 | Germany | Sept. 1, 1923 |
| 606,916 | France | June 23, 1926 |
| 644,380 | Great Britain | Oct. 11, 1950 |